Dec. 7, 1926.　　　　　　J. A. DEWIRE　　　　　　1,609,645

BOLT

Filed Feb. 21, 1923

INVENTOR
John A. Dewire
BY Delos G. Haynes
ATTORNEY

Patented Dec. 7, 1926.

1,609,645

UNITED STATES PATENT OFFICE.

JOHN A. DEWIRE, OF CHICAGO, ILLINOIS, ASSIGNOR TO MILLER & PARDEE, INC., OF CHICAGO, ILLINOIS, A CORPORATION OF ILLINOIS.

BOLT.

Application filed February 21, 1923. Serial No. 620,432.

This invention relates to self locking devices and with regard to certain more specific features, to a self locking bolt.

One of the objects of the present invention is to provide a simple and inexpensive device the parts of which may have relative rotation in one direction only, when the device is in normal position. Another object is the provision of a rugged and durable device in which relative rotation of the parts in one direction only is permitted during normal operation, but relative rotation in the opposite direction only, is permitted when the device is inverted. Other objects will be in part obvious and in part pointed out hereinafter.

The invention accordingly consists of the elements and combinations of elements, features of construction, and arrnagements of parts which will be exemplified in the structure hereinafter described and the scope of the application of which will be indicated in the following claim.

In the accompanying drawings, in which is shown one of various possible embodiments of the invention.

Similar reference characters indicate corresponding parts throughout the several views of the drawings.

Figure 1:
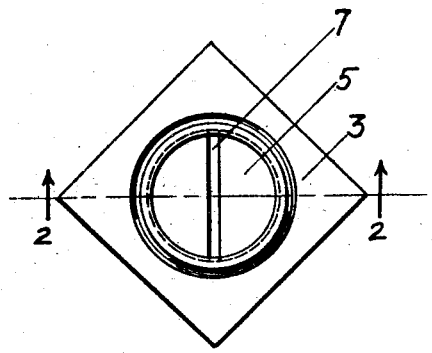
Fig. 1 is a plan.

Referring now to the accompanying drawings, there is illustrated a bolt comprising a threaded shank 1 and a head 3. The shank has an enlarged circular head portion 5 provided with a groove or recess 7 for reception of the screw driver or the like.

The squared head 3 surrounds the bolt and can rotate with respect throughout in one direction. In the embodiments shown in the drawings, the squared head can rotate counter clockwise with respect to the shank. Rotation of the shank clock-wise with respect to the shank is prevented by the action of a ball clutch comprising the ball 9 located in the inclined groove 11 in the squared head, and tending (by virtue of the inclined groove or runway 11) to enter the recesses or slots 17 and 19 in the shanks.

Figure 3:
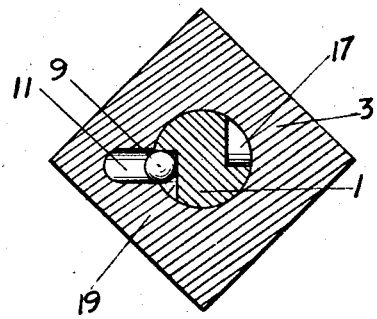
Fig. 3 is a horizontal section on the line 3—3 of Fig. 2.
Figure 2:
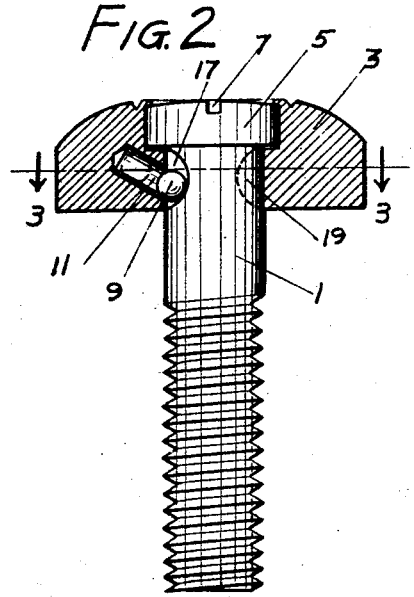
Fig. 2 is a sectional elevation on the line 2—2 of Fig. 1.

In Figs. 2 and 3 the ball 9 is shown as in the recess 19 in the shank. In such position, rotation of the squared head clock-wise would compel clock-wise rotation of the shank.

Figure 4:
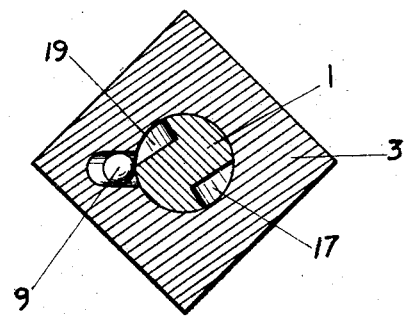
Fig. 4 is a view similar to Fig. 3, showing the parts in a different relative position.

Counter clock-wise rotation of the squared head, however, would merely cause the ball to ride up into the recess 11, and after a fraction of a turn of the squared head counter clock-wise, the ball would be in the position shown in Fig. 4. The same would occur if the squared head were held stationary and the shank rotated clock-wise.

A small fraction of a revolution of the squared head clock-wise with respect to the shank can of course occur, but merely enough rotation to bring the ball down into the deep part of one of the recesses 17, 19, as shown in Figs. 2 and 3. Further clock-wise rotation of the squared head with respect to the shank is then prevented, as above described.

Upon inverting the device the ball 9 rolls to the outer end of its slot 11, to the position indicated in dotted lines in Fig. 2. The clutch is thereby rendered ineffective and relative rotation of the shank and squared head in either direction may occur.

The device is simple in construction, effective in operation, and is not liable to become deranged through severe service conditions.

From the above it will be seen that the several objects of the invention are realized, and other advantageous results attained.

As various possible embodiments might be made of the above invention and various changes might be made in the embodiment above set forth it is to be understood that all matter herein set forth or shown in the accompanying drawings is to be interpreted as illustrative and not in a limiting sense.

I claim:

In apparatus of the class described, in combination, a threaded shank, a head rotatably secured thereon, an over-running clutch between the shank and the head comprising a ball, and an inclined groove or runway for the ball, tending to keep the ball in operative position when the device is in normal position, the ball passing to the other end of the run-way and thereby rendering the clutch inoperative, when the device is inverted.

In testimony whereof, I have signed my name to this specification this 19th day of February, 1923.

JOHN A. DEWIRE.